Nov. 3, 1959  M. C. ELEY ET AL  2,911,033
GAS TURBINE FUEL FEED REGULATING APPARATUS
Filed July 11, 1956
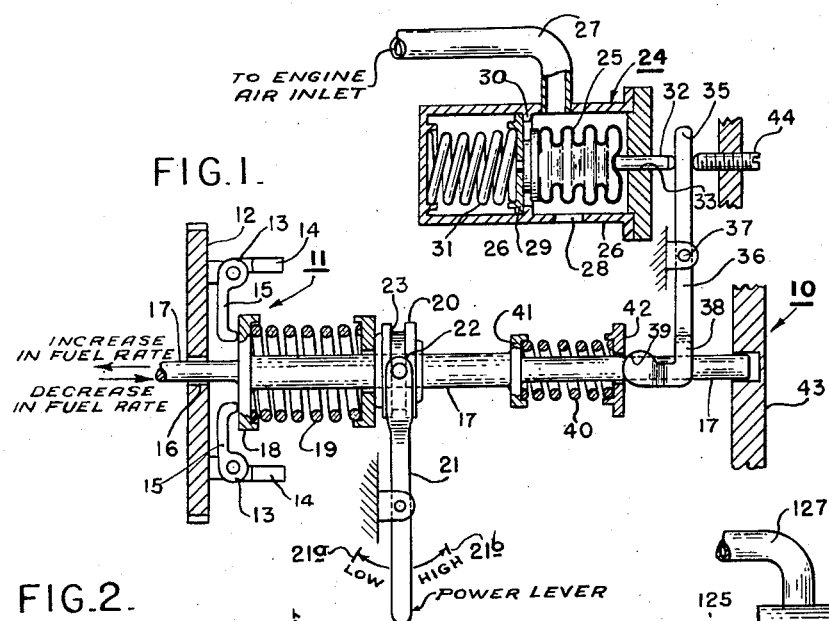
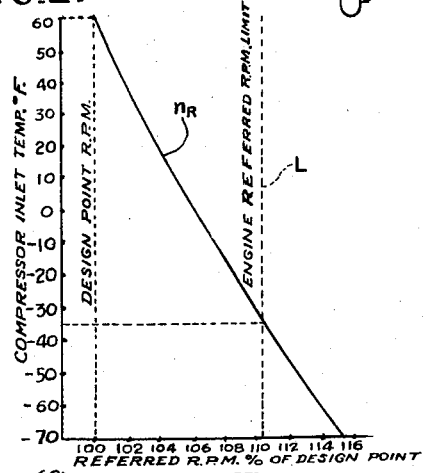
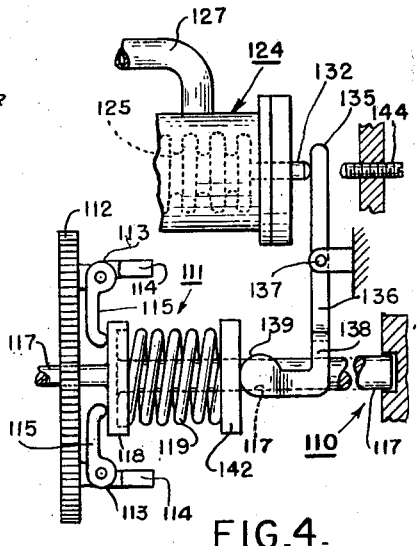
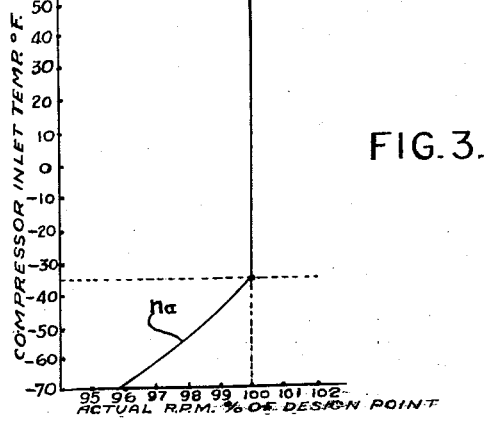
INVENTORS
MYRLE C. ELEY
DONALD F. WINTERS
BY Frank Cristiano Jr.
AGENT

United States Patent Office 2,911,033
Patented Nov. 3, 1959

2,911,033

GAS TURBINE FUEL FEED REGULATING APPARATUS

Myrle C. Eley, Shawnee, and Donald F. Winters, Overland Park, Kans., assignors to Westinghouse Electric Corporation, East Pittsburgh, Pa., a corporation of Pennsylvania Application July 11, 1956, Serial No. 597,299

4 Claims. (Cl. 158—36.4)

This invention relates to apparatus for controlling the rotational speed of an aviation gas turbine engine and has for an object to provide improved apparatus of this type.

In control apparatus for an aviation gas turbine engine, it is well known to provide speed sensing means responsive to actual rotational speed of the engine for regulating flow of fuel in a manner to maintain a constant actual rotational speed. However, a more precise indication of true engine conditions affecting the well known phenomenon "compressor stall" is referred rotational speed. Referred rotational speed is equal to $n_a/\sqrt{T_{Rel}}$ where $n_a$ is the actual rotational engine speed and $T_{Rel}$ is the absolute temperature of the air at the engine inlet relative to NACA standard day temperature. The NACA standard day temperature is 518.4° on the Rankine scale or 59° Fahrenheit. Thus, it will readily be seen that although with control apparatus of the above known type the actual rotational speed of the engine may be accurately maintained constant, the referred rotational speed of the engine will increase with reduction in relative absolute temperature of the compressor inlet air and may exceed the critical value for the engine.

Since aviation gas turbine engines are subjected to extreme variations in compressor inlet temperatures ranging as low as −70° F., for example, a control system scheduling fuel in a manner to maintain a selected actual rotational speed may overfuel the engine sufficiently at low compressor inlet temperatures to aerodynamically overstress the engine.

In view of the above, it is a further object of the invention to provide control apparatus for an aviation gas turbine engine wherein the rotational speed of the engine is limited in accordance with decreasing temperature of the air at the compressor inlet in a manner to avoid "compressor stall."

A more specific object of the invention is to provide control apparatus of the above type wherein means responsive to temperature of the compressor inlet air is arranged to modify the setting of the engine speed governor in a manner to limit the referred rotational speed to a maximum safe value.

Yet another object is to provide control apparatus of the above-mentioned type wherein the temperature sensing means is responsive to temperature of the air at the inlet to the engine and is arranged in a manner to modify the setting of the engine speed governor at temperatures below a predetermined value.

In accordance with the invention, there is provided a temperature sensing element responsive to compressor inlet air temperature and movable in a direction to modify the setting of the speeder spring on the engine speed governor in such a manner that when the compressor inlet temperature is reduced, the fuel input and, accordingly, the actual speed of the machine is reduced below the original set value of the governor. Since the referred critical rotational speed is the important control factor in the operation of the engine, the temperature sensing element is arranged in a manner to modify the speeder spring setting sufficiently to limit the referred rotational speed to the maximum safe value. Also, since at temperatures above a prescribed low temperature value the referred rotational speed is at a lower value than the actual rotational speed, a stop member is provided to render the temperature sensing element ineffective when the temperature of the air at the compressor inlet is above the prescribed low temperature value.

These and other objects are effected by the invention as will be apparent from the following description and claims taken in connection with the accompanying drawings, forming a part of this application, in which:

Fig. 1 is a view illustrating one form of the invention diagrammatically;

Fig. 2 is a chart illustrating referred rotational speed values of a typical aviation gas turbine engine in percent of design point referred r.p.m. attained with progressively decreasing compressor air inlet temperatures in degrees Fahrenheit;

Fig. 3 is a chart illustrating the required reduction in actual rotational speed of the engine in percent of design point actual r.p.m. to limit the referred speed to a maximum safe value at compressor air inlet temperatures below a prescribed low temperature in degrees Fahrenheit; and Fig. 4 is a fragmentary view illustrating diagrammatically another embodiment of the invention.

Referring to the drawing in detail, in Fig. 1, there is shown in diagrammatic form control apparatus 10 for an aviation gas turbine engine (not shown) including mechanism 11 for sensing the actual rotational speed of the engine.

The speed sensing mechanism 11 may be of the well known type including a gear 12 adapted to be rotated by the engine and carrying a pair of pivoted flyweight members 13 having weighted portions 14 movable radially outwardly by centrifugal forces and radially inwardly disposed finger portions 15 movable to the right, as viewed in the drawing. The gear 12 has a central aperture 16 through which extends an elongated spindle 17 having an integral radially enlarged portion or land 18. The land 18 is biased against the finger portions 15 of the flyweight members by a helically wound speeder spring 19 having carefully selected deflection characteristics. Means including a spool 20 slidably mounted on the spindle 17 and a pivoted power lever 21 are provided for varying the bias of the speeder spring 19 against the flyweight finger portions 15, as well known in the art. The power lever 21 is provided with a bifurcated end portion 22 received in an annular recess 23 formed in the outer periphery of the spool 20.

As thus far described, the speed sensing mechanism 11 operates in the following well-known manner: The power lever 21 may be moved to any desired speed setting between the low and high limits of travel 21a and 21b, respectively. At the low limit 21a, the bias effect of the speeder spring 19 is at a predetermined minimum value, hence, if the rotational speed of the gear 12 is higher than the predetermined minimum value, the flyweight members 13 are influenced by centrifugal force values of sufficient magnitude to move the spindle 17 to the right until the bias of the speeder spring 19 is in balance with the centrifugal forces acting on the flyweight finger portions 15. The spindle 17 is attached to a fuel valve servo mechanism (not shown) of well known type arranged in a manner to decrease the rate of fuel flow to the engine upon movement of the spindle 17 to the right, as mentioned above, and to increase the rate of fuel flow upon movement of the spindle in the opposite direction.

Hence, under the aforementioned conditions, the rate of fuel flow to the engine is reduced until the actual rotational speed of the engine attains the value corresponding to the power lever setting.

When it is desired to maintain a higher engine rotational speed, the power lever is moved counterclockwise to the desired position, thereby moving the spool 20 to the left and correspondingly increasing the bias effect of the speeder spring 19 on the land 18. Under such conditions, the spindle 17 is moved axially to the left against the centrifugal force acting on the flyweight members 13, thereby conditioning the fuel valve servo mechanism (not shown) for an increase in rate of fuel flow to the engine. The actual rotational speed of the engine is thus increased until the centrifugal forces acting on the flyweight members 13 and the bias of the speeder spring 19 are balanced.

The structure thus far described is adequate for controlling an aviation gas turbine at normal compressor inlet temperature conditions, for example, at temperatures above —35° F. since the actual rotational speed at such temperature is below the maximum safe referred rotational speed. By formula $$n_R = n_a / \sqrt{T_{Rel}}$$

where:

$n_R$ = Referred rotational speed of the engine.
$n_a$ = Actual speed of the engine.
$T_{Rel}$ = Absolute temperature of the air relative to NACA standard temperature (59° F.).

Thus, it will readily be seen that for any given actual rotational speed $n_a$, as $T_{Rel}$ decreases in value $n_R$ increases in value.

Fig. 2 is a graph illustrating a referred speed curve $n_R$ for a representative aviation gas turbine engine in which the actual speed is held constant at the engine design point, i.e., 100% r.p.m., and in which the maximum safe referred speed limit L is 110.5% of the design point speed. In this graph, referred rotational speed in percent of design point r.p.m. is plotted against compressor air inlet temperature in degrees Fahrenheit. By reference thereto, it will readily be seen that at a compressor air inlet temperature of 60° F., the referred r.p.m. is equal to the design point r.p.m. However, as the compressor inlet temperature is reduced, the referred r.p.m. increases at such a rate, that at —35° F. the referred r.p.m. attains the maximum safe referred speed limit L or 110.5% of the design point speed. As the compressor inlet temperature is further reduced, the referred r.p.m. exceeds the limit L until at —70° F. it assumes a value of 115.4% of the design point speed. Since the true factor limiting engine performance is the referred r.p.m. $n_R$, it will now be understood that the speed control mechanism 11 is highly inadequate at compressor inlet temperatures below certain limits. (In the example shown, this limit is —35° F., however, it may vary with different engines.)

In accordance with the invention, there is provided a temperature sensing mechanism 24 including a liquid filled bellows 25 disposed within a cylindrical housing 26, the interior of which is subjected to a continuous blast of air from the compressor inlet delivered thereto by a tube 27; so that, air at compressor inlet temperature constantly flows over the bellows 25. In order to provide for a constant flow therepast, an outlet aperture 28 may be provided in the housing. The bellows 25 is supported at one end by a plate 29 slidably received in the housing 26 and biased into abutment with an annular flange 30 by a helical spring 31. The other end of the bellows 25 is provided with an axially disposed actuator rod 32 extending through an aperture 33 in the housing and disposed in operative association with one end portion 35 of a rocker arm 36.

The rocker arm 36 is pivotally mounted intermediate its ends as indicated by the numeral 37 and has its other end portion 38 extending transversely across the spindle 17. The rocker arm is preferably bifurcated at the end portion 38 in a manner to provide a pair of smoothly rounded fingers 39 (only one shown). The rocker arm fingers 39 are disposed in a manner to modify the bias on a helically wound spring 40 (hereinafter called a bias speeder spring) received on the spindle 17 and disposed between a land 41 rigidly attached to the spindle 17 and a movable collar 42. The collar 42 is disposed in abutment with the rocker arm fingers 39, so that biasing forces exerted by the latter are transmitted to the bias speeder spring 40 in a uniform manner. Also, if desired, means 43 for slidably supporting the free end of the spindle 17 may be provided.

Range of movement of the rocker arm 36 is limited by an adjustable stop screw 44 preferably disposed in a manner to abut the rocker arm end portion 35.

As illustrated, the control apparatus 10 is in the position assumed at compressor inlet temperatures above —35° F., wherein the temperature sensing bellows is in an expanded position and its actuator rod 32 is in its maximum extended position. Under the above conditions, the rocker arm 36 is immovably held in abutment with the stop screw 44 by the bellows rod 32 in a position exerting maximum compression force on the bias speeder spring 40. The additional bias of the bias speeder spring 40 on the spindle 17 has the effect of increasing the speed calibration of the speeder spring 19, so that with the invention the maximum bias effect of the bias speeder spring and the speeder spring 19 must be taken into account in determining the various actual speed settings of the power lever 21.

Hence, at compressor inlet temperatures above —35° F., if the power lever is set for 100% design point speed, the engine is maintained at an actual speed of 100% design point. However, as the compressor inlet temperature falls below —35° F., the air flowing past the temperature sensing bellows 25 will cause it to contract in axial length, thereby retracting its actuator rod 32 and permitting the rocker arm 36 to rotate through a small angular increment in counterclockwise direction. As the rocker arm 36 assumes its new position as determined by decreased compressor inlet temperature, it permits the bias speeder spring 40 to expand through a proportionate linear increment, thereby reducing the bias on the spindle 17 and automatically reducing the actual engine speed setting.

The characteristics of the bias speeder spring 40 are chosen to modify the bias of the speeder spring 19 in a manner to reduce the actual engine speed setting sufficiently to prevent the referred engine speed from exceeding its maximum safe or critical value L. (In the example chosen, as previously stated, this value is 110.5% of the actual design point speed.)

Referring to Fig. 3 wherein a graph plotting actual engine speed in percent of design point r.p.m. against compressor inlet temperature in degrees Fahrenheit is shown, it will be seen that with the above described control apparatus the actual speed denoted by the curve $n_a$ is at the design point at —35° F. However, as the compressor inlet temperature is further reduced the actual speed is also reduced until at —70° F. it attains the reduced value of 95.8% of the design point speed r.p.m. This reduction in actual rotational speed is sufficient to limit the referred rotational speed to 110.5% of the design point speed; thereby preventing over-stressing of the engine for all compressor inlet temperature conditions incurred in flight.

The control apparatus 10 is also subject to considerably higher compressor inlet temperatures than those indicated in Fig. 3, and at such higher temperatures the temperature sensing bellows 25 will expand more than shown in the drawing, while further travel of its actuator rod 32 is arrested by the stop screw 44. In order to avoid over-stressing or damage to the bellows and its associated linkage, such expansion is safely taken up by compression of the compression spring 31. The characteristics of the spring 31 are such that it has a higher compression rate than the speeder spring 19 and the bias speeder spring 40. Hence, it is unyieldable as long as the bellows rod 32 is free to move and is yieldable only after further movement of the rod 32 is arrested by the stop screw 44.

In Fig. 4, another embodiment of the invention has been illustrated. This view is fragmentary, since those portions not shown may be identical to those previously described and illustrated in Fig. 1.

Referring to Fig. 4, there is shown control apparatus 110 of the constant or fixed speed type employing an engine speed sensing mechanism 111 similar to that shown in Fig. 1 and having an engine driven gear 112 carrying a pair of pivoted flyweight members 113 provided with finger portions 115 arranged to bear against the land 118 on the spindle 117. The land 118 is biased against the flyweight finger portions 115 by a speeder spring 119 interposed between the land 118 and a collar 142 slidably mounted on the spindle 117.

The bias effect of the speeder spring is modified by a rocker arm 136 pivoted at 137 and having a bifurcated end portion 138 forming a pair of fingers 139 (only one shown) disposed in abutment with the collar 142. The other end 135 of the rocker arm is interposed between the actuator rod 132 of a temperature sensing mechanism generally indicated 124 and an adjustable stop screw 144. As in the previous embodiment, the temperature sensing mechanism is responsive to compressor inlet air temperature, and is in communication with the inlet of the engine by means of an air delivery tube 127.

It will be noted that in this embodiment the adjustable power lever 21 and the bias speeder spring 40 employed in the first embodiment are omitted.

The control apparatus 110 is illustrated in the position assumed at temperatures within the range wherein it is desired to maintain the referred rotational speed of the engine within the maximum safe value. For simplicity of description of operation, it will be assumed that the conditions illustrated in Figs. 2 and 3 apply and that the constant speed setting in actual r.p.m. is at 100% (engine design point). Also, that at —35° F., the referred r.p.m. $n_R$ is equal to the referred r.p.m. limit L (110.5%) and becomes greater as the compressor inlet air temperature falls below —35° F., so that the range wherein it is desired to limit the referred r.p.m. is below —35° F.

When the temperature sensing mechanism 124 is subjected to compressor inlet air values below —35° F., as illustrated, its rod 132 is retracted, permitting the rocker arm to rotate counterclockwise to the position shown. In this position, the bias effect of the speeder spring 119 on the flyweight members 113 is reduced, thereby causing the spindle 117 to move to the right to a reduced speed setting, and reducing the rate of fuel flow to the engine. Thus, the engine speed is reduced to a maximum safe referred value.

As the temperature of the compressor inlet air increases, the temperature sensing element 125 expands in proportion thereto, extending its actuating rod to the right and moving the rocker arm 136 clockwise, thereby increasing the bias effect of the speeder spring 119 on the flyweights and, accordingly, increasing the referred speed setting on the engine.

As the temperature of the compressor inlet air attains the value of —35° F., the rod 132 is extended sufficiently to move the rocker arm into abutment with the stop screw 144, thereby further increasing the speed setting on the engine.

At temperatures above —35° F., since further clockwise movement is prevented by the stop screw, the temperature sensing mechanism 124 is ineffective to modify the bias effect of the speeder spring 119 on the flyweights, so that the actual engine speed is maintained at a constant value regardless of the compressor inlet temperature.

If desired, however, the stop screw 144 may be adjusted to increase or decrease the temperature value at which the temperature sensing element 125 is rendered ineffective to modify the bias effect of the speeder spring 119.

It will now be seen that the invention provides control apparatus for automatically limiting the referred r.p.m. of an aviation gas turbine engine to a maximum safe value at low relative absolute temperatures of the compressor inlet air below a predetermined value without attention by the pilot. Hence, the invention lends itself to application in pilotless aircraft.

It will further be seen that the invention is relatively simple to manufacture and of such a rugged and positive nature as to be highly reliable in operation.

While the invention has been shown in several forms, it will be obvious to those skilled in the art that it is not so limited, but is susceptible of various other changes and modifications without departing from the spirit thereof.

What is claimed is:

1. In apparatus for controlling the rotational speed of an aviation gas turbine engine comprising an engine driven governor having an axially movable spindle for regulating fuel rate of flow to said engine, speed sensing means including pivoted flyweights for moving said spindle and means including a speeder spring providing a bias effect on said flyweights for controlling the movement of said spindle; the combination comprising a temperature-sensing element responsive to temperature at the engine inlet, means actuated by said temperature sensing element for modifying the bias effect of said speeder spring, said means being arranged in a manner to decrease the bias effect on said flyweights with decrease in said temperature, and a stop member arranged to limit the travel of said temperature sensing element upon predetermined movement of the latter in response to increasing engine inlet temperature, whereby the bias modifying means is rendered ineffective to modify the bias effect of said speeder spring at engine inlet temperatures above a preselected value.

2. In apparatus for controlling the rotational speed of an aviation gas turbine engine comprising an engine driven governor having a speeder spring and means controlled by said speeder spring for regulating rate of fuel flow to said engine in a manner to maintain the rotational speed of said engine at a predetermined value; the combination comprising a temperature sensing element responsive to engine inlet temperature and movable in one direction in response to rise in temperature and in the opposite direction in response to fall in temperature, means including a rocker arm for modifying the bias effect of said speeder spring, said rocker arm having one end operatively associated with said temperature sensing element and its other end operatively associated with said speeder spring and being arranged in a manner to decrease bias effect of said speeder spring in response to movement of said temperature sensing element in said opposite direction, and a stop member for limiting movement of said temperature sensing element in said one direction to a corresponding preselected value, whereby said rocker arm is rendered ineffective to modify the bias effect of said speeder spring at engine inlet temperatures above said preselected value.

3. In apparatus for controlling the rotational speed of an aviation gas turbine engine comprising an engine driven governor having a speeder spring and means controlled by said speeder spring for regulating rate of fuel flow to said engine in a manner to maintain the rotational speed of said engine at a predetermined value; the combination comprising a temperature sensing element responsive to engine inlet temperature and movable in one direction in response to rise in temperature and in the opposite direction in response to fall in temperature, means including a rocker arm for modifying the bias effect of said speeder spring, said rocker arm having one end operatively associated with said temperature sensing element and its other end operatively associated with said speeder spring and being arranged in a manner to decrease the bias effect of said speeder spring in response to movement of said temperature sensing element in said opposite direction, a stop member for limiting movement of the temperature sensing element in said one direction to a corresponding preselected value, whereby the rocker arm is rendering ineffective to modify the bias effect of the speeder spring at engine inlet temperatures above said preselected value, said temperature sensing element comprising a heat expansible bellows and a resilient member for positioning said bellows, said resilient member having greater resistance to deflection than said speeder spring but being deflectible upon continued expansion of said bellows at engine inlet temperatures above the preselected value.

4. In apparatus for controlling the rotational speed of an aviation gas turbine engine comprising an engine driven governor having an axially movable spindle for regulating fuel rate of flow to said engine, speed sensing means for moving said spindle and means including a spring providing a bias on said spindle; the combination comprising a temperature sensing element movable in response to temperature at the engine inlet, means actuated by said temperature sensing element for modifying the bias of said spring on said spindle, said means being arranged in a manner to decrease the bias effect with decrease in said temperature, and a fixed stop member arranged to limit the travel of said temperature sensing element in response to increasing engine inlet temperature to a preselected value, whereby the bias modifying means is rendered ineffective to modify the bias of said spring at engine inlet temperatures above said preselected value.

References Cited in the file of this patent
UNITED STATES PATENTS

| | | |
|---|---|---|
| 2,750,734 | Anxionnaz et al. | June 19, 1956 |
| 2,759,549 | Best | Aug. 21, 1956 |